(12) United States Patent
Zaifman et al.

(10) Patent No.: US 8,429,132 B2
(45) Date of Patent: *Apr. 23, 2013

(54) METHODS, SYSTEMS, AND COMPUTER PROGRAM PRODUCTS FOR DATABASE TABLE AGGREGATION

(75) Inventors: Arthur Zaifman, Millburn, NJ (US); Saiprakash Rao, Skillman, NJ (US); Philip E. Brown, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,573

(22) Filed: Aug. 27, 2012

(65) Prior Publication Data

US 2012/0323974 A1    Dec. 20, 2012

Related U.S. Application Data

(63) Continuation of application No. 12/338,136, filed on Dec. 18, 2008, now Pat. No. 8,275,751.

(51) Int. Cl.
*G06F 7/00* (2006.01)
*G06F 17/00* (2006.01)

(52) U.S. Cl.
USPC ........................................................ 707/661

(58) Field of Classification Search .................. None
See application file for complete search history.

(56) References Cited

U.S. PATENT DOCUMENTS

| | | | |
|---|---|---|---|
| 4,321,685 A | 3/1982 | Kasuga et al. | |
| 4,430,721 A | 2/1984 | Acampora | |
| 5,283,596 A | 2/1994 | Long | |
| 5,463,731 A | 10/1995 | Diec et al. | |
| 5,969,667 A | 10/1999 | Farmer et al. | |
| 6,611,150 B1 | 8/2003 | Stevens | |
| 6,624,829 B1 | 9/2003 | Beck et al. | |
| 6,745,139 B2 | 6/2004 | Chou et al. | |
| 6,751,565 B2 * | 6/2004 | Naroska et al. | 702/67 |
| 6,751,656 B2 | 6/2004 | Naroska et al. | |
| 6,993,545 B2 | 1/2006 | Shiraishi | |
| 7,216,046 B2 | 5/2007 | Agoston et al. | |
| 2002/0059351 A1 | 5/2002 | Shiraishi | |
| 2003/0236640 A1 | 12/2003 | Naroska et al. | |
| 2004/0034488 A1 | 2/2004 | Chou et al. | |
| 2004/0186673 A1 | 9/2004 | Agoston et al. | |
| 2005/0035967 A1 | 2/2005 | Joffrain et al. | |
| 2006/0169529 A1 | 8/2006 | Tamakoshi | |
| 2011/0015868 A1 * | 1/2011 | Zeng et al. | 702/19 |

* cited by examiner

*Primary Examiner* — Pierre Vital
*Assistant Examiner* — Taelor Kim
(74) *Attorney, Agent, or Firm* — Cantor Colburn LLP

(57) ABSTRACT

Database table aggregation is implemented by a method that includes encoding first and second components via a waveform definition, the first and second components specifying criteria for aggregating data. The method also includes generating a complex waveform representing the components in a pattern corresponding to the waveform definition and criteria, which spans a first axis indicative of a time period for aggregating the data. The method further includes providing a byte count for aggregated data stored in a first table defined by the criteria, aggregating the data for the time period, and creating a second table for overflow data when the count is exceeded. The method also includes updating the complex waveform to reflect results of the aggregation that includes generating a waveform representing the second table along a second axis depicted at a location corresponding to a time in which the data aggregation for the first table was initiated.

20 Claims, 7 Drawing Sheets

METHODS, SYSTEMS, AND COMPUTER PROGRAM PRODUCTS FOR DATABASE TABLE AGGREGATION

CROSS-REFERENCE TO RELATED APPLICATION

This application is a continuation of U.S. patent application Ser. No. 12/338,136, filed Dec. 18, 2008, the disclosure of which is incorporated by reference herein in its entirety.

BACKGROUND

The present invention relates generally to database management, and more particularly, to methods, systems, and computer program products for database table aggregation.

Databases are software systems that support the storage of data as collections of logical constructs called tables, each of the tables containing records with a specified structure. In some implementations, the physical representation of a table is one or more files on a disk. In the case where there is a large amount of data to be added to a database (or to be stored for an extended period of time), it is desirable to find approaches for storage that reduce the overhead, in terms of costs and retrieval times, to store and access these large amounts of data.

One approach is to distribute this data across large number of tables or a large number of files for a given table, possibly based on some characteristic of the data, such as a timestamp interval. This is considered a partitioning or aggregation of the data. However, in situations where the volume of data to manage is highly variable (i.e., the tables or files produced vary significantly in terms of size or number of records), this solution may not be ideal, as this can result in excess storage costs, as well as a decrease in performance levels associated with access times.

What is needed, therefore, is a way to manage variably sized data volumes that provides balance to the resulting table and file sizes, thereby maximizing performance levels and reducing overhead costs otherwise associated with storing and accessing large amounts of data.

BRIEF SUMMARY

Exemplary embodiments include methods for database table aggregation. A method includes encoding first and second components via a waveform definition, the first and second components specifying criteria for aggregating data. The method also includes generating a complex waveform representing the components in a pattern corresponding to the waveform definition and criteria, which spans a first axis indicative of a time period for aggregating the data. The method further includes providing a byte count for aggregated data stored in a first table defined by the criteria, aggregating the data for the time period, and creating a second table for overflow data when the count is exceeded. The method also includes updating the complex waveform to reflect results of the aggregation that includes generating a waveform representing the second table along a second axis depicted at a location corresponding to a time in which the data aggregation for the first table was initiated.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

In accordance with exemplary embodiments, a database management scheme for aggregating variably sized data volumes with respect to tables and files in a database management system is provided. The database management scheme aggregates or partitions variably sized data volumes in a manner that provides balance to resulting table and file sizes, thereby minimizing costs associated with storing and accessing the data. In exemplary embodiments, the database management scheme specifies complex periodic aggregation waveforms that control the reading/writing of data from/to specified database tables.

The following definitions are provided.

Complex periodic aggregation waveform. A complex periodic aggregation waveform represents a waveform that is composed of some number (>0) of simple square waves of varying amplitudes, periods, and phases. A complex periodic aggregation waveform begins on an actual date and time and continues to repeat/oscillate until a second waveform (e.g., one with a later start date/time) is created. When the second waveform is created, the complex periodic aggregation waveform is disabled, however, it remains valid in order to support read operations (e.g., reading data that was created prior to the current waveform's start date/time.

Simple square wave. A simple square wave is a wave consisting of one rising edge and one falling edge with an amplitude equal to its priority, a period equal to some relative time span (and potentially affected by a byte count threshold if so configured), and a phase corresponding to a database table name.

Simple square wave priority. A simple square wave priority is a positive integer greater than or equal to 1, and in cases of overlap, the square wave with the highest priority is selected to contain the data in the overlapping regions of the square waves.

Components. Components reflect the set of component square wave definitions that are combined to form the complex periodic aggregation waveform.

Figure 1:
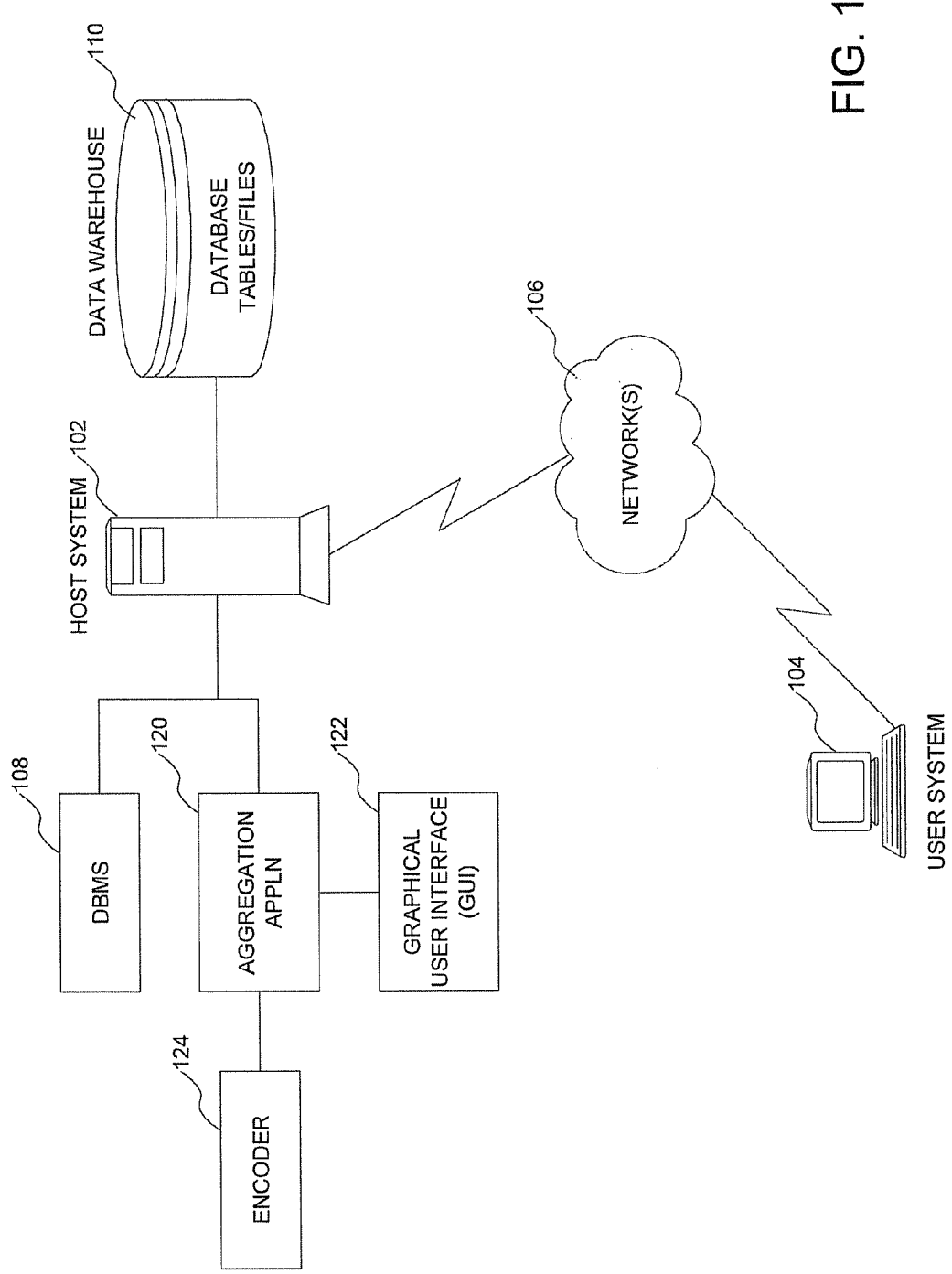
FIG. 1 is a block diagram of a system upon which database management processes may be implemented in accordance with exemplary embodiments.

Turning now to FIG. 1 a block diagram of a system 100 for implementing the database management scheme will now be described in accordance with exemplary embodiments. In one exemplary embodiment, the system of FIG. 1 includes a host system 102 in communication with a user system 104 and a data warehouse 110 over one or more network(s) 106. The system 100 may be implemented by a business enterprise.

The user system 104 may be operated by a user of the business enterprise for performing various activities pursuant to the business needs. In an exemplary embodiment, the user accesses the host system 102 to implement the features and functions of the database management scheme as will be described. The user system 104 may be implemented using a general-purpose computer executing a computer program for carrying out the processes described herein. While only one user system 104 is shown in the system of FIG. 1, it will be understood that many user systems 104 may be implemented in order to realize the advantages of the database management scheme.

The host system 102 may be implemented using one or more servers operating in response to a computer program stored in a storage medium accessible by the server(s). The host system 102 may operate as a network server (e.g., a web server) to communicate with the user system 104 and other network entities, e.g., the data warehouse 110. The host system 102 handles sending and receiving information to and from the user system 104 and can perform associated tasks. The host system 102 executes one or more enterprise applications in furtherance of the business goals of the enterprise. For example, the business enterprise may implement applications for performing various data processing activities, including data mining and integration activities, among others. In addition, the host system 102 executes a database management system 108 for managing aspects of the data stored on, and retrieved from, the data warehouse 110. In an exemplary embodiment, the host system 102 also executes an aggregation application 120 to implement the database management scheme described herein. In a further exemplary embodiment, the aggregation application 120 includes an encoder component 124, as will be described further herein.

The host system 102 is in communication with the data warehouse 110. The data warehouse 110 may be implemented using memory contained in the host system 102 or it may be a separate physical or logical device. In the exemplary embodiment shown in FIG. 1, the host system 102 is in direct communication with the data warehouse 110 (e.g., via physical cabling). In an alternative exemplary embodiment, the host system 102 may be in communication with the data warehouse 110 over the network(s) 106. It will be understood, however, that other network implementations may be utilized. For example, the data warehouse 110 may be logically addressable as a consolidated data source across a distributed environment that includes one or more of the networks 106. Information stored in the data warehouse 110 may be retrieved and manipulated via the host system 102. The data warehouse 110 stores a variety of information for use in implementing the database management scheme processes described herein. As shown in FIG. 1, e.g., the data warehouse 110 stores database files and tables.

Network(s) 106 may include any type of known network including, but not limited to, a wide area network (WAN), a local area network (LAN), a global network (e.g. Internet), a virtual private network (VPN), and an intranet. The network(s) 106 may be implemented using a wireless network or any kind of physical network implementation known in the art. A user system 104 may be coupled to the host system 102 through multiple networks (e.g., intranet and Internet) so that not all user systems 104 are coupled to the host system 102 through the same network. In an alternative embodiment, the user system 104 and the host system 102 may be one and the same processor device.

In one exemplary embodiment, the aggregation application 120 includes a graphical user interface 122 for enabling users (e.g., an individual at user system 104) to access the aggregation application 120 and configure components used in implementing the database management scheme processes. The aggregation application 120 may be integrated with the database management system 108 or may be a separate application that interfaces with the database management system 108. As shown in FIG. 1, the aggregation application 120 is implemented as a separate interface to the database management system 108.

Figure 2A:
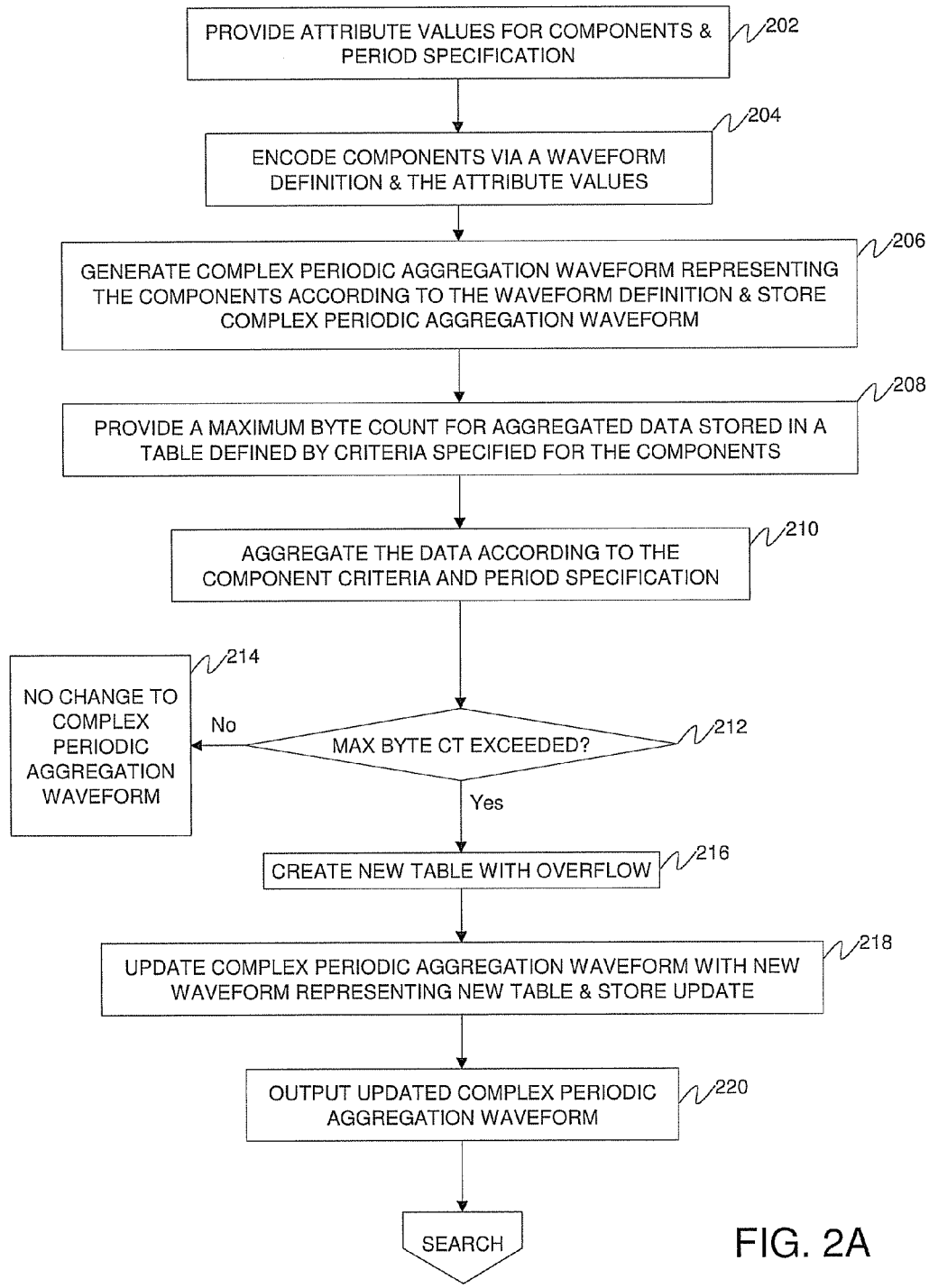
FIGS. 2A-2B illustrate a flow diagram describing a process for implementing the database management processes in accordance with exemplary embodiments.
Figure 2B:
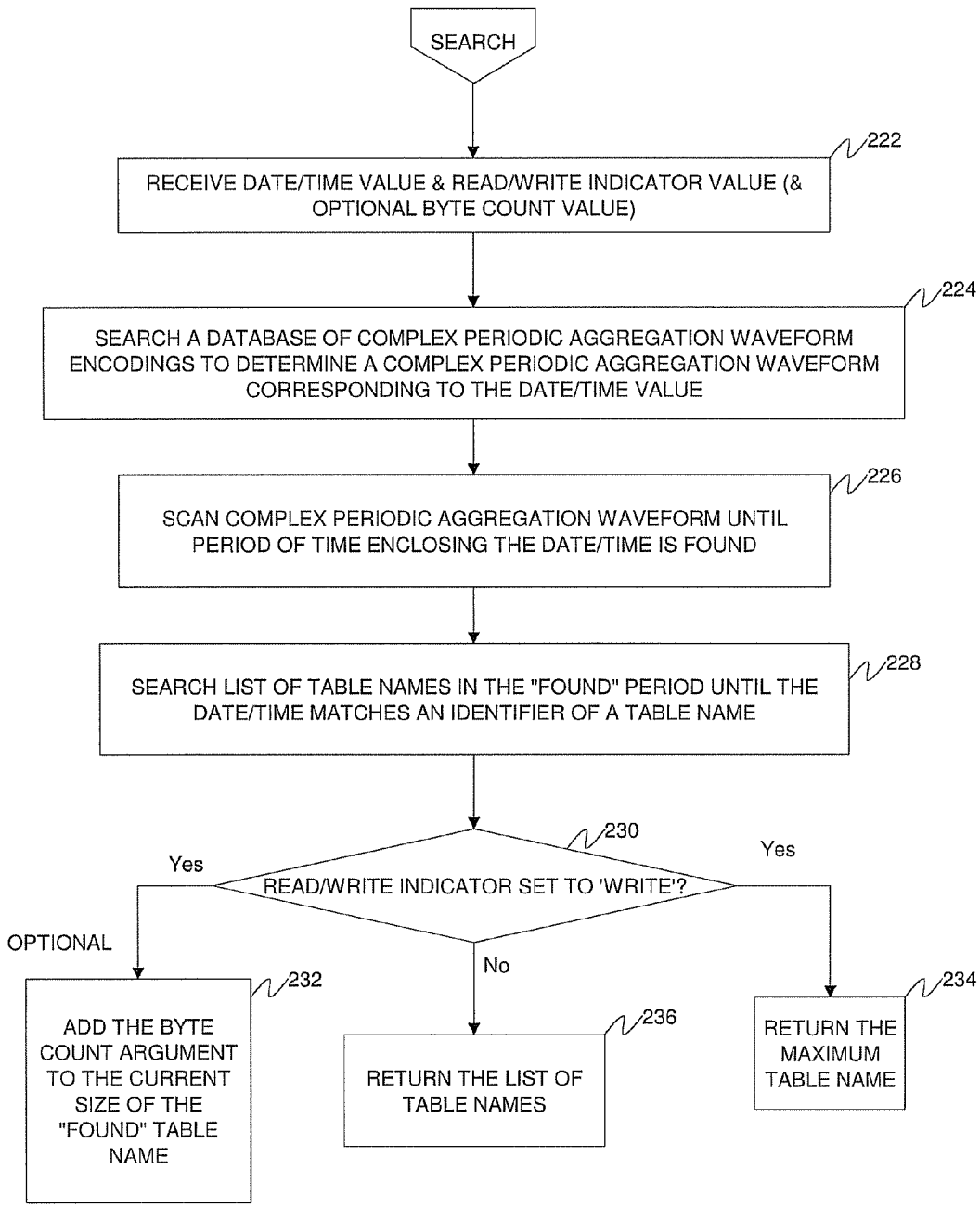
Figure 3:
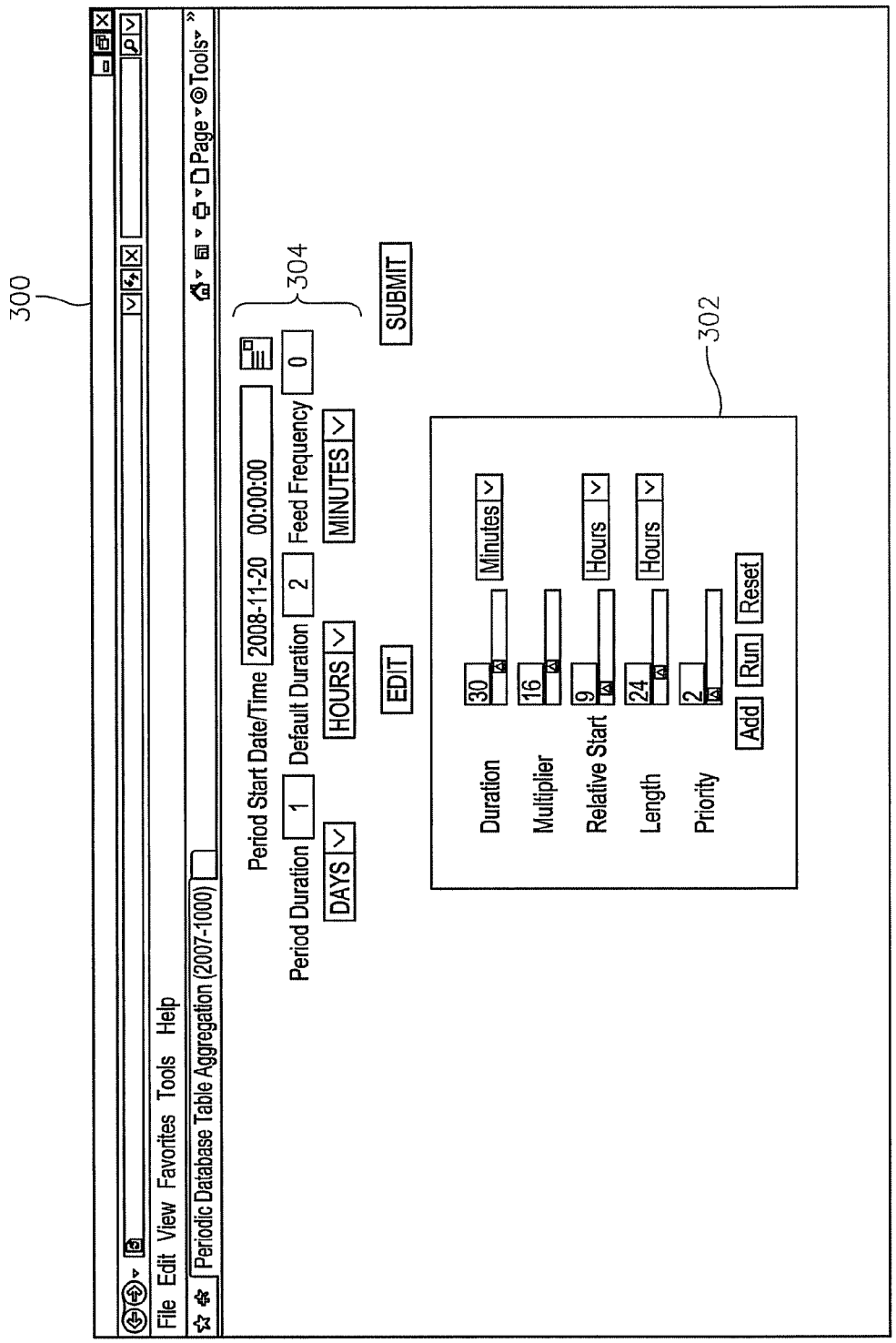
FIG. 3 is user interface screen provided by the database management processes for configuring components of a complex periodic aggregation waveform in accordance with exemplary embodiments.

Turning now to FIGS. 2A, 2B, and 3, an exemplary process and user interface screen for implementing the database management scheme will now be described in exemplary embodiments. A user at user system 104 may access the aggregation application 120 via the GUI 122 and is prompted to enter data to configure the components of a complex data aggregation waveform, as will now be described.

At step 202, a number of components and a period specification are defined by component attributes. It will be understood that any number of components may be defined for a complex periodic aggregation waveform in order to realize the exemplary embodiments of the invention. Component attributes include: {Aggregation Duration, Count (or multiplier), Relative Start, Period Duration (or length), Priority}. As shown in a user interface screen 300 of FIG. 3, each component is defined by entering attribute values in corresponding data fields provided in a window 302 of screen 300.

Aggregation duration refers to the simple square wave period (expressed in units of time) and is an integral divisor of the complex periodic aggregation waveform's period.

Count, or multiplier, refers to the number of consecutive and identical simple square waves.

Relative start refers to the offset/phase (expressed in units of time) of the first simple square wave's rising edge relative to the start of the enclosing complex periodic aggregation waveform.

Period duration, or length, refers to the component square wave period (and is an integral divisor of the complex periodic aggregation waveform's period).

Priority refers to the amplitude of the simple square waves that compose the component square wave. Component priority plays a role when a region between the rising and falling edges of at least two distinct simple component definitions overlap/intersect and the definition with the high priority is the one that's respected; that is, for the component with the highest priority, all data received during the relative time period it represents will flow into the single table that spans the time period. The priority value may be represented on a complex periodic aggregation waveform via a third axis of the complex periodic aggregation waveform (see, e.g., FIG. 5B).

Attributes of the period specification definition include: {Actual Start Date/Time, Duration, Default Aggregation Duration, Feed Arrival Frequency, Component$_1$, Component$_2$, ..., Component$_n$}. As shown in the user interface screen 300 of FIG. 3, the period specification is defined by entering attribute values in corresponding data fields collectively represented in screen 300 as fields 304.

The actual start date/time refers to the start date and time of the first rising edge of the complex periodic aggregation waveform. The duration refers to the length of the period expressed in units of time. The duration value may be represented on a complex periodic aggregation waveform by a first axis of the complex periodic aggregation waveform (see, e.g., FIG. 5B). The default aggregation duration refers to the period of the simple square wave when no other square waves are defined for a particular time range.

Feed arrival frequency refers to the duration of time between successive arrivals of data. Note that it is assumed that a feed file contains records and that the event to which a record corresponds occurred on or before the date/time encoded in the feed file's file name.

At step 204, the components defined in step 202 are encoded via a waveform definition and the attribute values provided in step 202.

Figure 6:
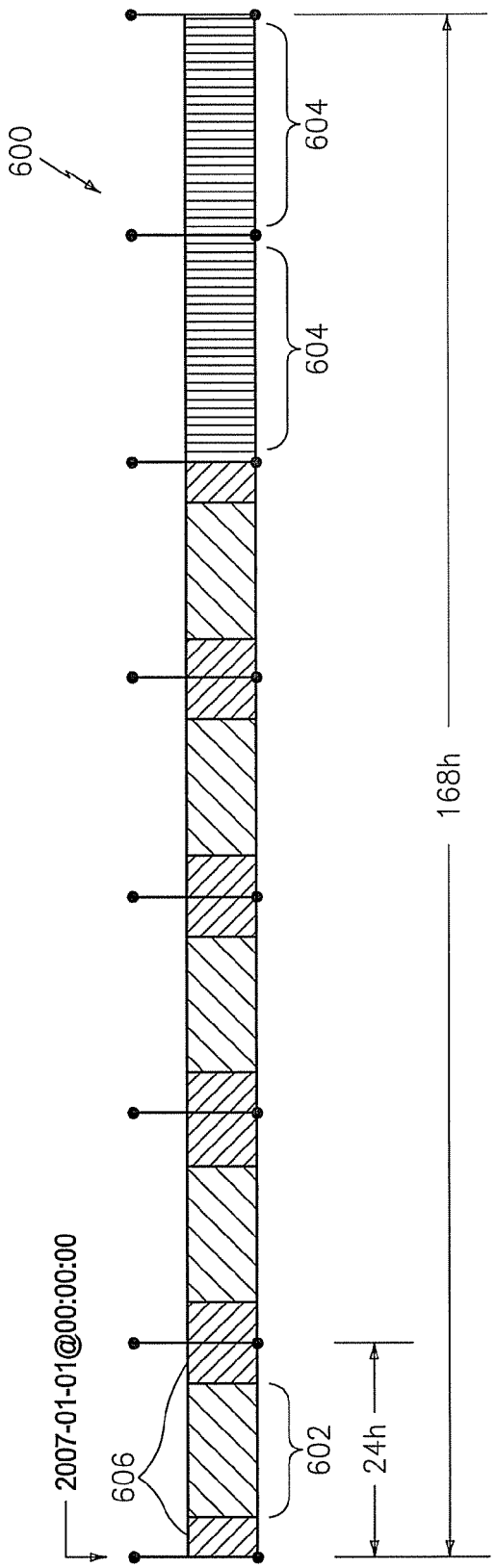
FIG. 6 illustrates a graphical representation of three sample discrete waveforms combined into a single periodic, repeating complex periodic aggregation waveform via the database management processes in accordance with exemplary embodiments.

For illustrative purposes, a graphical representation of three discrete waveforms combined into a single periodic, repeating waveform is shown in FIG. 6 by way of example. In this example, it is supposed that the user would like to aggregate data collected from Monday through Friday between the hours of 8:00 am and 4:00 pm into hourly tables, aggregate data collected from weekends into a single table spanning 48 hours, and include a default setting that aggregates data into 24 hour tables. Three component definitions are provided by the user via the GUI 122:

Component$_1$={1 h, 8, 8 h, 24 h, 0}
Component$_2$={48 h, 1, 120 h, 168 h, 1}
Component$_{Default}$={24 h, 1, 0 h, 24, −1}

Continuing with the above example, a sample period specification for complex periodic aggregation waveform may be configured as: {2007-01-01@00:00:00, 168 h, 24 h, 10 m, Component$_1$, Component$_2$, ..., Component$_{Default}$}.

The period specification defines when this waveform repeats by the duration element, which as indicated above, is 168 hours. The feed arrival frequency element specifies the frequency in which a file will be processed. The default aggregation duration element is a multiple of the feed arrival frequency.

As shown in the graphical representation 600 of FIG. 6, the values provided in Component$_1$ (602) reveal that data collection will be performed on an hourly basis beginning at 8 am until 4:00 pm (Monday through Friday). The relative start time of '8 h' is relative to the actual start time in the period specification, which is defined as 00:00:00, as shown above. Data is stored into eight hourly tables corresponding to the time period. This type of component configuration reflected in Component$_1$ offers a unique perspective on the data from a performance standpoint. The definitions in Component$_1$ provide for the separation of data at a finer granularity then those of Component$_2$ (604), which offers an increased level of parallelism; that is, the data can be searched in parallel as opposed to looking at one monolithic view. The definitions provided in Component$_1$ are optimal for peak business hours, when the business enterprise expects data volumes to be much higher, and the interest in the data is greater, so it is helpful to implement better performance queries.

Component$_2$ (604) is configured to provide data aggregation at a much lower granularity, as it manages the data received on a weekend. Here, the data is aggregated into fewer separate tables.

Component$_{Default}$ (606) is configured to store data received in one full day into a daily table so this default definition is used when the other defined components lack in definitions. In other words, if Component$_1$ (602) and Component$_2$ (604) do not completely define a continuous time range, then the properties of the default range (Component$_{Default}$) take over when the encoding feature is activated.

The component definitions described above can be used to represent complex discrete waveforms. Any complex waveform with period duration $D_{complex}$ and priority $P_{complex}$ can be decomposed into more than one periodic-aggregation-component encoding by isolating each rising and falling edge pair into a separate discrete waveform. Once isolated, this simple discrete waveform may be defined as follows:

Aggregation Duration=falling edge minus rising edge;
Count=1;
Relative Start=rising edge;
Period Duration=$D_{complex}$; and
Priority=$P_{complex}$.

The range between rising and falling edges map to a number of separate tables, whereby the number is determined by the aggregation duration element. Using the example Component$_1$ described above, the number of hourly tables for defined Period Duration is eight. Each of the tables may be identified by its start date/time, e.g., 2007-01-01@08:00:00.1 h, 2007-01-01@09:00:00.1 h, 2007-01-01@10:00:00.1 h, etc.

At step 206, the aggregation application 120 generates a complex periodic aggregation waveform representing the components according to attribute values and the waveform definition. The complex periodic aggregation waveform includes variable-sized square waves respectively representing the components in a repeating pattern that corresponds to the waveform definition and the criteria, respectively, and which spans a length of a first axis that corresponds to the period of time defined in the Duration attribute of the period specification.

Figure 4:
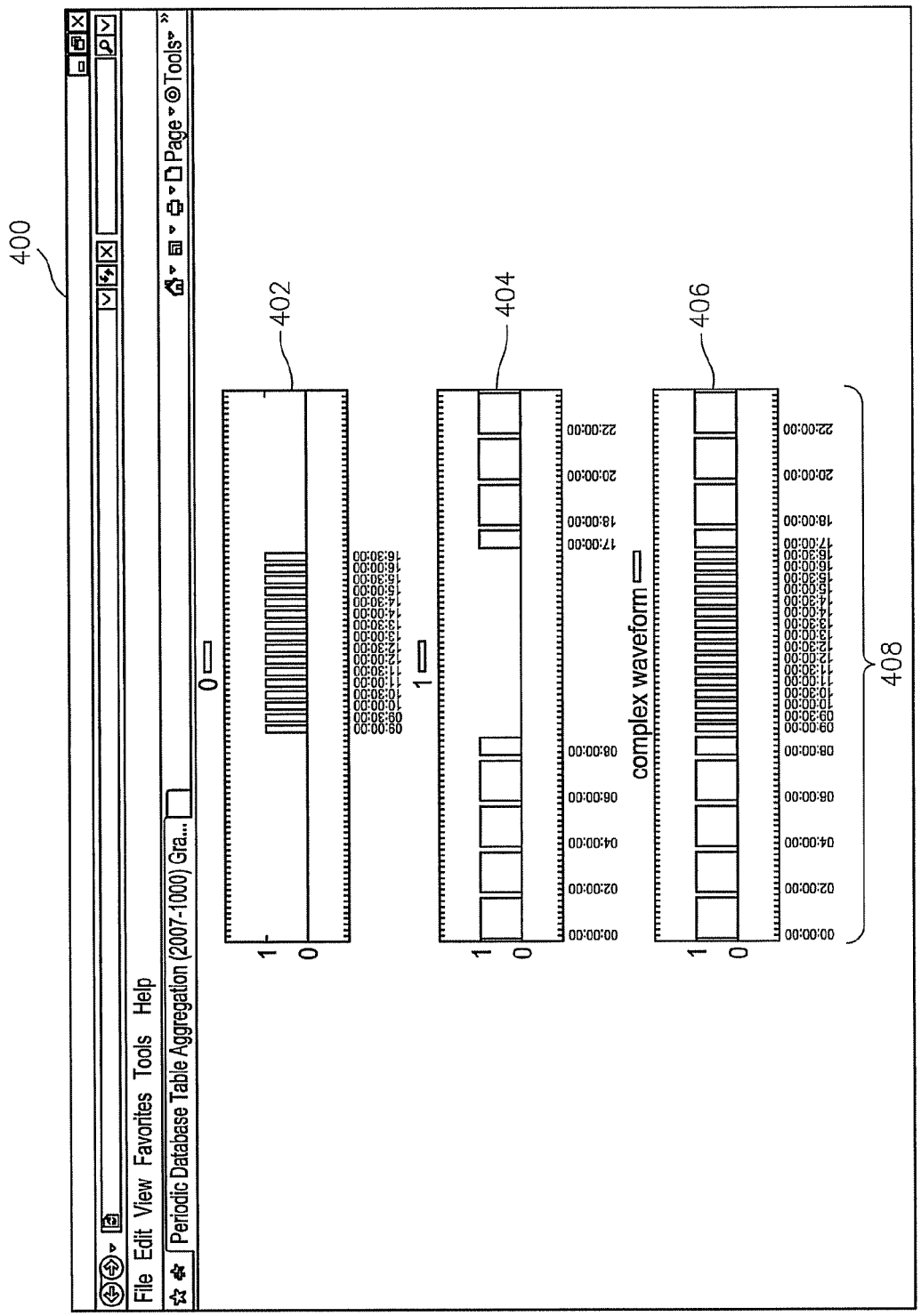
FIG. 4 is a user interface screen illustrating a graphical depiction of a sample complex data aggregation waveform created by the database management processes performed via the user interface screen of FIG. 3, in accordance with exemplary embodiments.

The complex periodic aggregation waveform is stored in a database as a complex periodic aggregation encoding (CPAE) and is distinguished from other stored complex periodic aggregation waveforms (encodings) by a unique identifier that specifies the actual start date and time of the data aggregation defined for the complex periodic aggregation waveform. A sample complex periodic aggregation waveform generated from the attributes provided in FIG. 3 is shown in a user interface screen 400 of FIG. 4. A waveform 402 represents a first defined component, a waveform 404 represents a second defined component, and a complex periodic aggregation waveform 406 represents the combined components 402/404. The aggregation application 120 creates and stores tables containing aggregated data for the components based upon the criteria, respectively. Each of the tables is assigned an identifier corresponding to a start date and time in which data is aggregated and stored in the tables. As shown in FIG. 4, e.g., each of the tables in the complex periodic aggregation waveform 406 has a start date and time 408.

At step 208, the aggregation application 120 receives, e.g., from a user at user system 104 via the user interface, a maximum byte count for aggregating the data stored in a table defined by criteria specified for the components in step 202. The maximum byte count may serve as a threshold value specifying a maximum number of bytes that may be contained by a component square wave.

At step 210, the data is aggregated by the aggregation application 120 according to the component criteria and the period specification.

At step 212, it is determined whether the maximum byte count has been exceeded. If not, at step 214, no changes are made to the complex periodic aggregation waveform or to the tables defined by the complex periodic aggregation waveform.

At step 216, if the maximum byte count has been exceeded, the aggregation application 120 creates a new table with the data overflow, and updates the complex periodic aggregation waveform with a new waveform graphically representing the new table at step 218. The updated complex periodic aggregation waveform is stored in the database and may be output to the user system 104 via the user interface of the aggregation application 120 at step 220. The process proceeds to FIG. 2B, in which a search of the database of complex periodic aggregation waveforms may be conducted as will now be described.

At step 222, the aggregation application 120 receives a date/time value and a read/write indicator value for a search. The aggregation application 120 may optionally receive a maximum byte count, or threshold value (e.g., valid for "write" operations). Using this value, the application 120 returns a list of table names (where the list length is greater than 1 if the read/write indicator is equal to "read" and one or more threshold overflows occurred, i.e., maximum byte count is exceeded). A single table name is returned if the read/write indicator is equal to "write" or the table has not overflowed its respective threshold.

The aggregation application 120 searches a list of complex periodic aggregation encodings (CPAE) at step 224 until the date/time value entered in step 222 is greater than or equal to $CPAE_n$ and less than $CPAE_{n+1}$.

The aggregation application 120 scans the complex periodic aggregation waveform resulting from the search. The scan of the complex periodic aggregation waveform continues until the time period that encloses the date/time value is found at step 226.

At step 228, the aggregation application 120 searches the list of table names in the "found" time period from step 226 until the date/time value is greater than or equal to table $name_n$ and less than table $name_{n+1}$.

At step 230, it is determined whether the read/write indicator is equal to "write." If so, and the optional byte count value was entered in step 222, the aggregation application 120 adds the byte count value to the current size of the "found" table name at step 232 to determine if a new cloned table needs to be created (along a second axis, e.g., a z-axis).

If the read/write indicator is equal to "write," at step 230, the aggregation application 120 returns the maximum table name on the second axis at step 234.

If the read/write indicator is equal to "read," at step 230, the aggregation application 120 returns the list of table names along the second axis at step 236.

Figure 5:
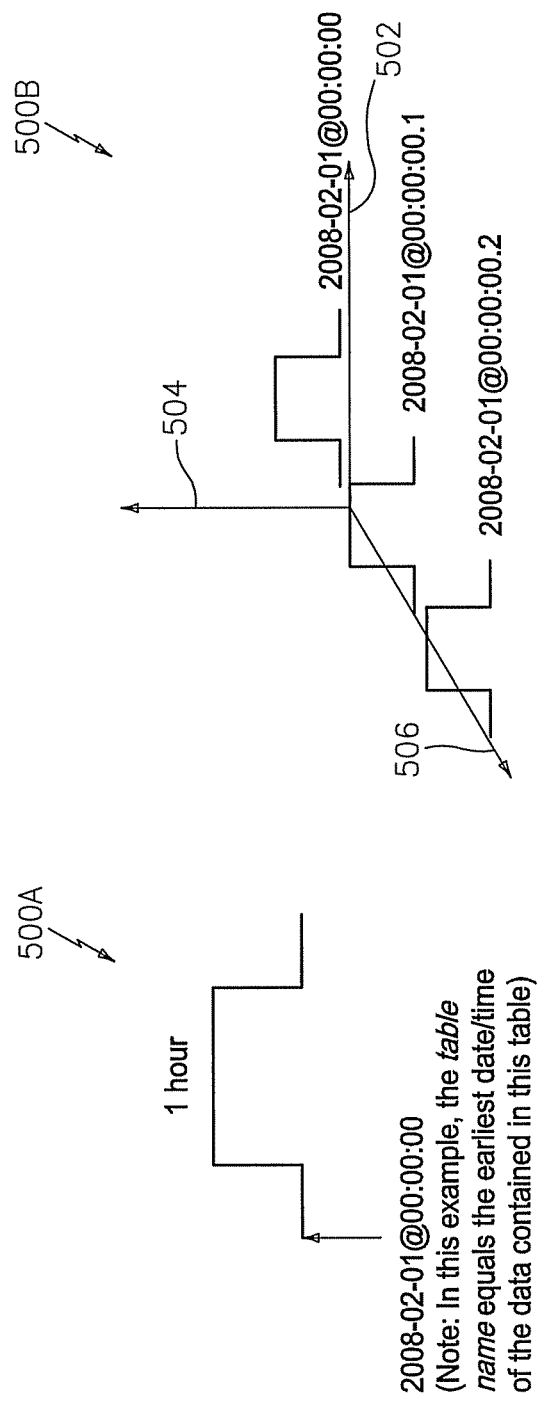
FIGS. 5A-5B is a sample complex periodic aggregation waveform updated to include a waveform representing new database tables in an exemplary embodiment.

As shown in FIG. 5A, a table 500A is depicted as a single waveform, and is identified by a table name that reflects the earliest date/time of the data contained in the table 500A. The same table 500A is shown in FIG. 5B along a first axis 502. As indicated above, in cases of data overflow, in which the byte count threshold value has been exceeded for a waveform, the aggregation application 120 generates one or more new tables, which are depicted in FIG. 5B as two waveforms extending along a second axis 506. Additionally, as indicated above, a priority value assigned to the waveform may be represented along a third axis 504.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method, comprising:
    encoding first and second components via a waveform definition and attribute values of the respective first and second components, the first component specifying first criteria for aggregating data and the second component specifying second criteria for aggregating data;
    generating a complex periodic aggregation waveform having square waves representing the first and second components in a repeating pattern corresponding to the waveform definition and the first and second criteria, respectively, and which spans a length of a first axis indicative of a period of time for aggregating the data;
    providing, as a threshold value, a maximum byte count for aggregated data stored in a first table defined by at least one of the first and second criteria, and aggregating the data for the duration of the period of time and in accordance with the attribute values of the respective first and second components;
    creating a second table for overflow of data determined for the first table when the threshold value has been exceeded;
    updating the complex periodic aggregation waveform to reflect results of the data aggregation, the updating including generating a waveform representing the second table along a second axis, the second axis depicted at a location corresponding to a time in which the data aggregation for the first table was initiated;
    creating tables containing aggregated data for the first and second components based upon the first and second criteria, each of the tables assigned an identifier indicating a start date and time in which the data is stored in the tables, the tables including the first and second tables;

in response to receiving a start date/time value and a read/write indicator value, wherein a read indicator specifies a read operation and a write indicator specifies a write operation, searching a database of complex periodic aggregation waveforms until the start date/time value exceeds an identifier of a complex periodic aggregation waveform in the database, scanning the complex periodic aggregation waveform found in response to the searching until a period of time specified in one of the first and second criteria encloses the start date/time value, and searching a list of the tables until the start date/time value is equal to an identifier of one of the tables in the list; and in response to determining the table found in response to the searching has an amount of aggregated data that exceeds the maximum byte count, performing one of the read operation and the write operation with respect to the table found in response to the searching and based upon the read/write indicator value.

2. The method of claim 1, further comprising:

providing the attribute values for the first component;

providing attribute values for attributes that define a period specification including the period of time, the period of time encapsulating a duration of time in which data is aggregated pursuant to the first criteria and a duration of time in which data is aggregated pursuant to the second criteria; and storing the attribute values of the first component, second component, and period specification in a database as a complex periodic aggregation encoding, and assigning a unique identifier to the complex periodic aggregation encoding, the unique identifier comprising a start date and time for aggregating the data.

3. The method of claim 2, wherein criteria used to define the period specification include:

the start date and time;

a duration;

a default aggregation duration;

a feedback arrival frequency; and the first and second components.

4. The method of claim 1, wherein criteria used to define components include:

an aggregation duration that indicates a unit of time in which data is aggregated for a period duration, the period duration defining a rising and falling edge of a square wave that is defined by a component;

a count indicating a number of tables created for the aggregation duration, the number of tables including the first and second tables;

a relative start time indicating a time in which data aggregation is initiated for a component; and priority value indicating a priority of a component that is evaluated when an overlap in component definitions occurs.

5. The method of claim 1, wherein generating the complex periodic aggregation waveform includes depicting start dates and times for each of the tables at corresponding locations on the complex periodic aggregation waveform.

6. The method of claim 1, further comprising:

outputting a graphical depiction of the updated complex periodic aggregation waveform.

7. The method of claim 1, further comprising:

if the read/write indicator value is equal to the write operation, returning a maximum table name representing the table having the latest start date and time; and if the read/write indicator value is equal to the read operation, returning the list of table names for a component indicating the threshold value has been exceeded.

8. A system, comprising:

a host system computer; and an aggregation application executing on the host system computer, the aggregation application including an encoder, the encoder encoding first and second components via a waveform definition and attribute values of the respective first and second components, the first component specifying first criteria for aggregating data and the second component specifying second criteria for aggregating data;

the aggregation application generating a complex periodic aggregation waveform having square waves representing the first and second components in a repeating pattern corresponding to the waveform definition and the first and second criteria, respectively, and which spans a length of a first axis indicative of a period of time for aggregating the data;

providing as a threshold value, via a user interface of the aggregation application, a maximum byte count for aggregated data stored in a first table defined by at least one of the first and second criteria, and the aggregation application aggregating the data for the duration of the period of time and in accordance with the attribute values of the respective first and second components;

the aggregation application creating a second table for overflow of data determined for the first table when the threshold value has been exceeded;

the aggregation application updating the complex periodic aggregation waveform to reflect results of the data aggregation, the updating including generating a waveform representing the second table along a second axis, the second axis depicted at a location corresponding to time in which the data aggregation for the first table was initiated;

creating tables containing aggregated data for the first and second components based upon the first and second criteria, each of the tables assigned an identifier indicating to a start date and time in which data is stored in the tables, the tables including the first and second tables;

in response to receiving a start date/time value and a read/write indicator value, wherein a read indicator specifies a read operation and a write indicator specifies a write operation, searching a database of complex periodic aggregation waveforms until the start date/time value exceeds an identifier of a complex periodic aggregation waveform in the database, scanning the complex periodic aggregation waveform found in response to the searching until a period of time specified in one of the first and second criteria encloses the start date/time value, and searching a list of the tables until the start date/time value is equal to an identifier of one of the tables in the list; and in response to determining the table found in response to the searching has an amount of aggregated data that exceeds the maximum byte count, performing one of the read operation and the write operation with respect to the table found in response to the searching and based upon the read/write indicator value.

9. The system of claim 8, further comprising:
the aggregation application providing the attribute values for the first component via the user interface of the aggregation application;
the aggregation application providing, via the user interface of the attribute application, attribute values for attributes that define a period specification including the period of time, the period of time encapsulating: a duration of time in which data is aggregated pursuant to the first criteria, and a duration of time in which data is aggregated pursuant to the second criteria; and
the aggregation application storing the attribute values of the first component, second component, and period specification in a database as a complex periodic aggregation encoding, and assigning a unique identifier to the complex periodic aggregation encoding, the unique identifier comprising a start date and time for aggregating the data.

10. The system of claim 9, wherein criteria used to define the period specification include:
the start date and time;
a duration;
a default aggregation duration;
a feedback arrival frequency; and
the first and second components.

11. The system of claim 8, wherein criteria used to define components include:
an aggregation duration that indicates a unit of time in which data is aggregated for a period duration, the period duration defining a rising and falling edge of a square wave that is defined by a component;
a count indicating a number of tables created for the aggregation duration, the number of tables including the first and second tables;
a relative start time indicating a time in which data aggregation is initiated for a component; and
priority value indicating a priority of a component that is evaluated when an overlap in component definitions occurs.

12. The system of claim 8, wherein generating the complex periodic aggregation waveform includes depicting start dates and times for each of the tables at corresponding locations on the complex periodic aggregation waveform.

13. The system of claim 8, further comprising:
outputting a graphical depiction of the updated complex periodic aggregation waveform.

14. A computer program product comprising a non-transitory storage medium having computer-readable program code embodied thereon, the program code causing a computer to implement:
encoding first and second components via a waveform definition and attribute values of the respective first and second components, the first component specifying first criteria for aggregating data and the second component specifying second criteria for aggregating data;
generating a complex periodic aggregation waveform having square waves representing the first and second components in a repeating pattern corresponding to the waveform definition and the first and second criteria, respectively, and which spans a length of a first axis indicative of a period of time for aggregating the data;
providing, as a threshold value, a maximum byte count for aggregated data stored in a first table defined by at least one of the first and second criteria, and aggregating the data for the duration of the period of time and in accordance with the attribute values of the respective first and second components;
creating a second table for overflow of data determined for the first table when the threshold value has been exceeded;
updating the complex periodic aggregation waveform to reflect results of the data aggregation, the updating including generating a waveform representing the second table along a second axis, the second axis depicted at a location corresponding to time in which the data aggregation for the first table was initiated;
creating tables containing aggregated data for the first and second components based upon the first and second criteria, each of the tables assigned an identifier indicating a start date and time in which data is stored in the tables, the tables including the first and second tables;
in response to receiving a start date/time value and a read/write indicator value, wherein a read indicator specifies a read operation and a write indicator specifies a write operation, searching a database of complex periodic aggregation waveforms until the start date/time value exceeds an identifier of a complex periodic aggregation waveform in the database, scanning the complex periodic aggregation waveform found in response to the searching until a period of time specified in one of the first and second criteria encloses the start date/time value, and searching a list of the tables until the start date/time value is equal to an identifier of one of the tables in the list; and
in response to determining the table found in response to the searching has an amount of aggregated data that exceeds the maximum byte count, performing one of the read operation and the write operation with respect to the table found in response to the searching and based upon the read/write indicator value.

15. The computer program product of claim 14, further comprising program code implementing:
providing the attribute values for the first component;
providing attribute values for attributes that define a period specification including the period of time, the period of time encapsulating: a duration of time in which data is aggregated pursuant to the first criteria, and a duration of time in which data is aggregated pursuant to the second criteria; and
storing the attribute values of the first component, second component, and period specification in a database as a complex periodic aggregation encoding, and assigning a unique identifier to the complex periodic aggregation encoding, the unique identifier comprising a start date and time for aggregating the data.

16. The computer program product of claim 15, wherein criteria used to define the period specification includes:
the start date and time;
a duration;
a default aggregation duration;
a feedback arrival frequency; and
the first and second components.

17. The computer program product of claim 14, wherein criteria used to define components include:
an aggregation duration that indicates a unit of time in which data is aggregated for a period duration, the period duration defining a rising and falling edge of a square wave that is defined by a component;
a count indicating a number of tables created for the aggregation duration, the number of tables including the first and second tables;
a relative start time indicating a time in which data aggregation is initiated for a component; and priority value indicating a priority of a component that is evaluated when an overlap in component definitions occurs.

18. The computer program product of claim 14, wherein generating the complex periodic aggregation waveform includes depicting start dates and times for each of the tables at corresponding locations on the complex periodic aggregation waveform.

19. The computer program product of claim 14, further comprising program code implementing:
   outputting a graphical depiction of the updated complex periodic aggregation waveform.

20. The computer program product of claim 14, further comprising program code implementing:
   if the read/write indicator value is equal to the write operation, returning a maximum table name representing the table having the latest start date and time; and
   if the read/write indicator value is equal to the read operation, returning the list of table names for a component indicating the threshold value has been exceeded.

* * * * *